United States Patent [19]  [11] 4,235,273
Edwards et al.  [45] Nov. 25, 1980

[54] PNEUMATIC TIRES

[75] Inventors: Reginald H. Edwards, Sutton Coldfield; John A. Holdsworth, Redditch, both of England

[73] Assignee: Dunlop Limited, London, England

[21] Appl. No.: 858,795

[22] Filed: Dec. 8, 1977

Related U.S. Application Data

[63] Continuation of Ser. No. 681,039, Apr. 28, 1976, abandoned, which is a continuation of Ser. No. 515,245, Oct. 16, 1974, abandoned.

[30] Foreign Application Priority Data

Oct. 20, 1973 [GB] United Kingdom ............... 48981/73

[51] Int. Cl.$^3$ .............................................. B60C 17/00
[52] U.S. Cl. .......................... 152/330 RF; 152/330 L; 152/352 A; 152/354 R
[58] Field of Search ................................ 152/352–354, 152/357, 362 R, 362 CS, 374, 330 R, 330 L, 330 RF

[56] References Cited

U.S. PATENT DOCUMENTS

| | | | |
|---|---|---|---|
| 3,052,275 | 9/1962 | Hylbert, Jr. | 152/354 |
| 3,207,200 | 9/1965 | Boussu et al. | 152/354 |
| 3,814,161 | 6/1974 | Powell et al. | 152/353 R |
| 3,841,375 | 10/1974 | Edwards | 152/330 RF |
| 3,911,987 | 10/1975 | Takusagawa et al. | 152/330 RF |
| 3,921,690 | 11/1975 | Edwards | 152/330 RF |
| 3,954,131 | 5/1976 | Hoshino et al. | 152/330 RF |
| 4,059,138 | 11/1977 | Mirtain et al. | 152/330 RF |

Primary Examiner—John J. Love
Assistant Examiner—D. W. Underwood
Attorney, Agent, or Firm—Stevens, Davis, Miller & Mosher

[57] ABSTRACT

A pneumatic tire for use in a lubricated tire and wheel assembly which has a braced tread, wider than its rim and sidewalls reinforced by radial cords. The thickness of the sidewalls is at least 5% of the maximum width of the tire and at least 30% of it comprises rubber on the inside of the tire carcass.

5 Claims, 4 Drawing Figures

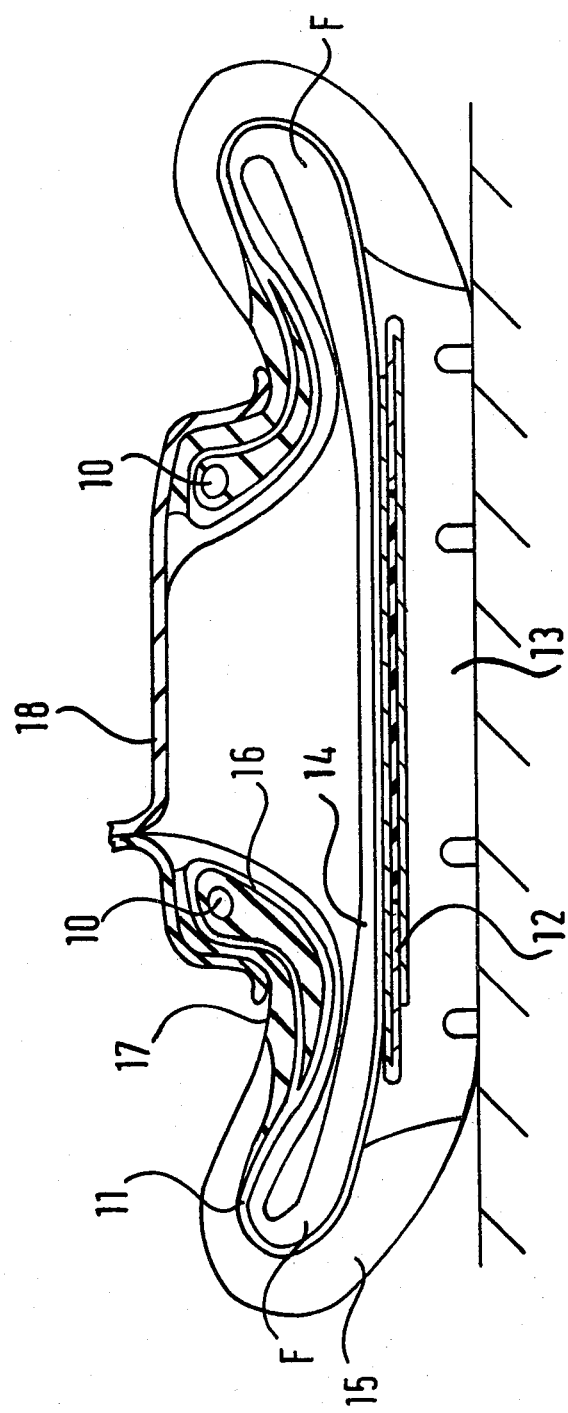

PNEUMATIC TIRES

This is a continuation of application Ser. No. 681,039 filed Apr. 28, 1976 which in turn is a Continuation of Ser. No. 515,245 filed Oct. 16, 1974 (now abandoned).

This invention relates to pneumatic tires, and more particularly tires which are suitable for use in a lubricated tire/wheel assembly which is capable of use after the tire has become deflated.

Assemblies of this type are described, for example, in the assignees U.K. Pat. Nos. 1,359,467, 1,359,468 and 1,359,461.

When a conventional pneumatic tire is run in an inflated condition, the deflection of the tire under load is limited by the presence of the inflation air. The deflection can be varied in normal usage by inflation to a higher pressure, e.g. to reduce tire deflection if sustained high speed fast running under heavy loads is contemplated, or by reduction of pressure, e.g. to increase tire deflection and gain traction at low speed on snow or mud.

When a tire is run in a deflated condition the deflection of the tire under load is dependent only upon the stiffness of the tire itself. It will be appreciated that when friction between contacting surfaces in the assembly has been eliminated, this being an immediate source of great heat if an unlubricated tire is run deflated, the problem in sustained running becomes the heat generated by flexing of the rubber itself, through hysteresis.

In the assignees UK Pat. No. 1,395,714 and U.S. Application No. 413,603 filed Nov. 7, 1973 it has been shown that the heat generated in this way can be reduced by utilizing rubber of high resilience. However, the problem cannot be eliminated in this way since rubber of 100% resilience which would be suitable for use as a tire sidewall is not known.

The severe flexing of the sidewalls of the tire which takes place when the tire is run in a deflated condition arises in the portions of the tire passing into, through and out of the ground contact zone. This flexing is a complex bending both in a radial plane and in a plane perpendicular to the surface of the sidewall and to the radial plane and, provided there are no deep grooves or other similar stress concentrating features in the tire sidewall, is taking place in a region of the tire sidewall extending from radially inwards of the point of maximum width of the tire to the tire shoulder.

According to the invention a pneumatic tire for use in a lubricated tire and wheel assembly comprises a tread, braced by a breaker assembly, sidewall portions and beads, and which is reinforced at least in the sidewall portions by a carcass consisting of cords extending in substantially radial planes, the width of said tread being at least 35% greater than the distance between the heels of the beads of said tire when inflated, the sidewalls each having at their thinnest point a thickness of at least 5% of the maximum width of the tire and at least 25% of said thickness consisting of rubber on the interior of the carcass of the tire, the tire having an aspect ratio when inflated less than 75%.

We have now found that to reduce heat generation in the sidewall it is desirable to increase the radius of curvature of the bends in the sidewall by thickening the sidewall and at the same time to equalize the strains in the rubber of the sidewall by positioning rubber on the inside of the carcass plies so that the latter are positioned at or close to the center of the sidewall.

Thus there is a bulk of rubber on either side of the neutral axis of the tire sidewall, the neutral axis lying in or adjacent to the carcass plies owing to their inextensibility relative to the rubber. The significance of this is that whether the sidewall is bent inwardly or outwardly there is a relatively thick layer of rubber radially inwardly of the neutral axis (referring to the radius of the bending curvature) which is placed in compression. Rubber is far more resistant to compression than to stretching so that in this way the resistance of the sidewall to sharp folding in either direction is increased. It should be appreciated that, when a tire is run in a deflated condition, the sidewall undergoes bending in two directions as it passes through the ground contact area; firstly the sidewall is bent so as to be convex inwardly in a fold entering the ground contact area, then the sidewall is bent so as to be convex outwardly in the main "flattening" fold at the ground contact patch, then the first fold is repeated as the sidewall passes out of the ground contact area.

Preferably the part of the sidewall which is thinnest is adjacent to the point of maximum width of the tire, the thickness of the sidewall increasing from the thinnest part towards the tire shoulder, at least 25% of the thickness of the sidewall in that region of the sidewall between the thinnest part of the sidewall and the tire shoulder comprising rubber on the inside of the tire carcass.

The thickness of each sidewall is preferably not more than 10% of the maximum width of the tire, and preferably also between 30% and 50% of the thickness of the sidewall comprises rubber on the inside of the carcass.

It is desirable that the sidewalls and bead regions of the tire are made up of highly resilient rubber in order to minimize heat generation. The sidewall and lining rubbers are preferably compounds of hardness between 45 and 65 Shore A and preferably each have a resilience of at least 85% measured at 50° C. by the Dunlop Pendulum method (BS 903 part A8 method 'C') and more preferably 87% as described in U.K. Pat. No. 1,395,714. The harder rubbers used, for example, for the bead apex and clinch strip in the bead region preferably have a hardness of at least 70 Shore A and a resilience greater than 60% measured at 50° C. by the same method and preferably 65%. It will be appreciated that the harder a rubber compound, the more difficult it becomes to obtain a high resilience. On the other hand the harder and hence stiffer, the rubber the less strain is produced in the rubber for a given stress so that the less flexing will take place in the rubber.

Preferably the tire has a shape and relative structural stiffness as described in U.S. Pat. No. 3,851,691 in order to achieve the desired degree of lateral stability when in use in a deflated condition.

The tire of this invention may be used with advantage in a tire and wheel assembly having a two-part lubrication system as described in co-pending U.S. Patent Application Nos. 536,972 filed Dec. 23, 1974 and 536,945 filed Dec. 23, 1974.

The invention will now be described in more detail, by way of example only, with reference to the accompanying drawings in which:

FIG. 4 is a cross-sectional view through the ground contact patch of a tire and wheel assembly in accordance with the invention, with the tire deflated and under its scheduled load.

Figure 1:
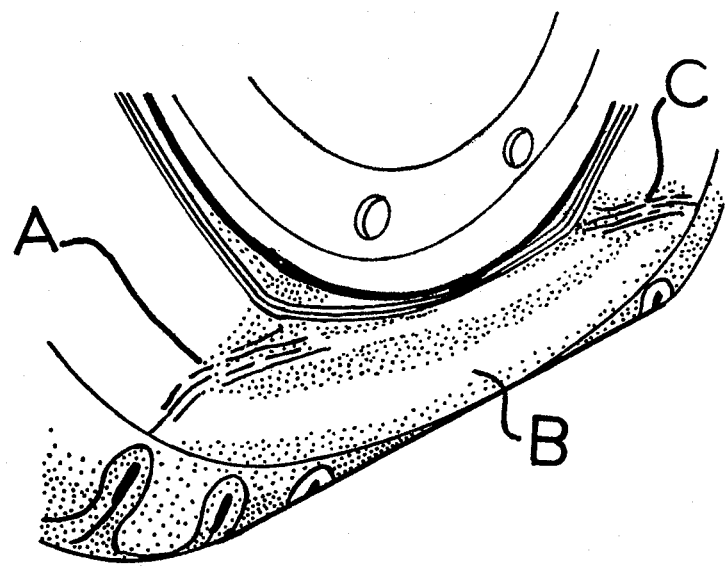
FIG. 1 is a side view of a tire and wheel assembly with sidewalls of more usual thickness in a loaded, deflated condition.

FIG. 1 illustrates the folding which takes place when a tire is run deflated and which, with normal sidewalls, gives rise to sharp folds which are likely to cause local heating and failure. At 'A' the sidewall is bent so as to be convex inwardly in a plane perpendicular to the surface of the sidewall, and to the radial plane. Then at 'B' the sidewall is bent in the radial plane so as to be convex outwardly as shown in FIG. 4. Finally, at C the condition of zone A is repeated. As is clear from the drawing in the absence of strong lateral forces, this bending is centered in the region of the sidewall extending from slightly below the point of maximum tire width to the tire shoulder. It will be appreciated that at A and C the sidewall is undergoing reversal of its normal moulded curvature.

Figure 2:
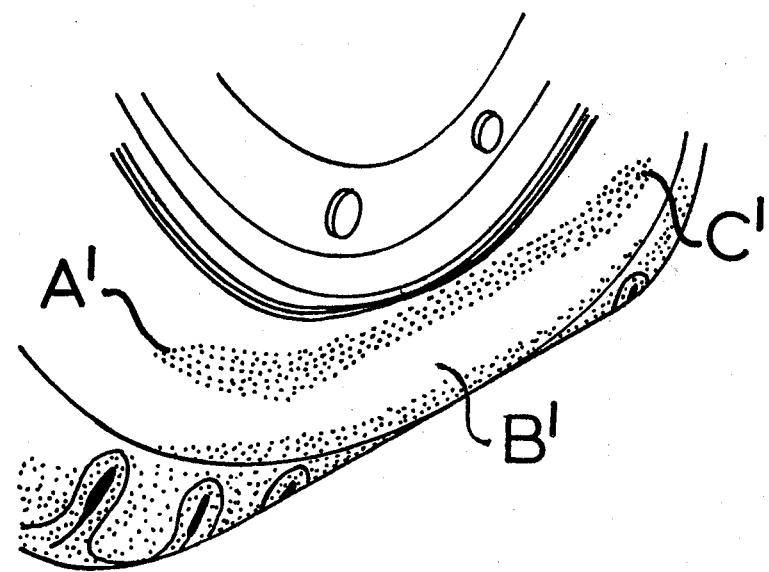
FIG. 2 is a comparable view to FIG. 1, showing a tire and wheel assembly in accordance with this invention.

FIG. 2 illustrates the same condition with the tire of this invention. The curvature of the sidewall in all three zones 'A', 'B' and 'C' is reduced owing to the presence in each case of rubber bulk inside the neutral axis of the sidewall. This rubber is being compressed, and has, of course, a very high modulus in compression.

Figure 3:
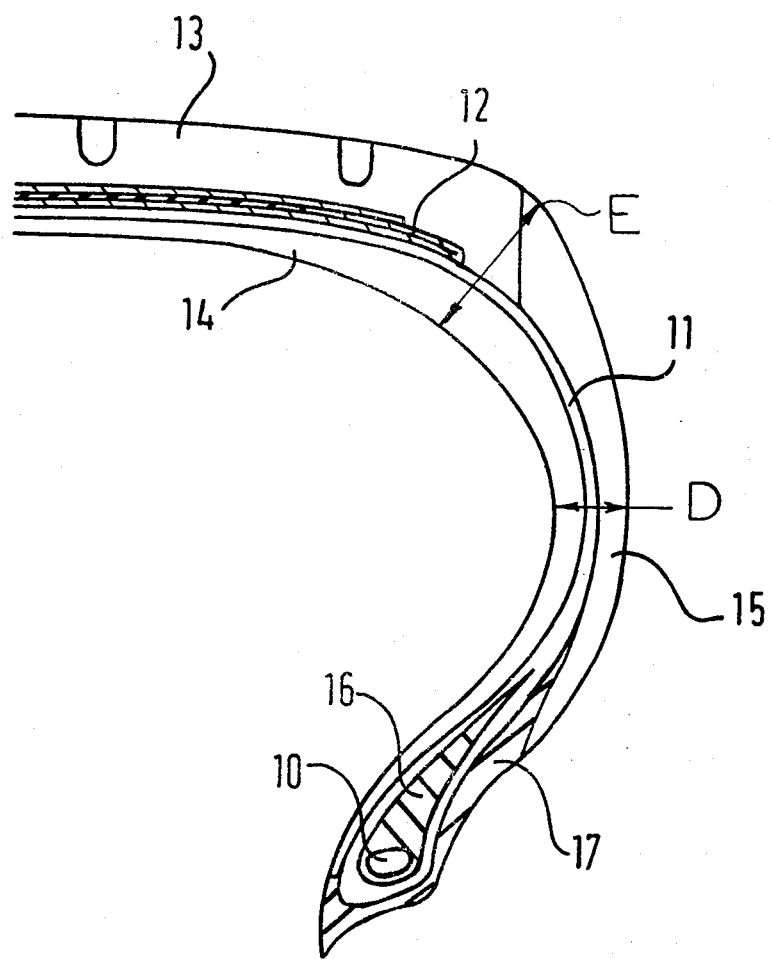
FIG. 3 is a cross-sectional view through a part of a tire in accordance with this invention.

The internal construction of the sidewall of the tire is shown in detail in FIG. 3. The tire reinforcing structure consists of a pair of bead cores 10, a radial ply carcass 11 extending from bead to bead and consisting of two plies of rayon cords having a bias angle of 88° relative to the tire mid-circumferential plane, and a breaker assembly 12 consisting of two plies of steel cords of bias angle 18° one edge of one ply being folded outwardly as shown, the other edge of the other ply being folded inwardly.

The rubber components of the tire consist of the tread rubber 13, lining 14, sidewall rubber 15, bead apex strip 16 and clinch strip 17. The tread rubber compound is a conventional synthetic rubber tread compound (SBR) with a hardness of 67, Shore A and a resilience of 47%. The lining 14 is a natural rubber compound having a hardness of 55 Shore A and a resilience of 87%, and the sidewall rubber 15 is another natural rubber compound but having a resilience of 87% and a hardness of 60 Shore A. The rubber compound of the apex and clinch strips is the same, based on an 85% natural rubber/15% SBR blend of polymers, with a hardness of 80 Shore A and a resilience of 62%.

The tire illustrated is a 205/65 375 tire of the type described in U.K. Patent Application No. 45,306/71 which has a maximum width of 193 mm when mounted on a wheel rim and inflated. The tire is shown in FIG. 3 in its moulded shape, it has a tread width of 176 mm and is to be mounted on a wheel rim whose width is 105 mm. The overall thickness of the sidewall at its narrowest part 'D' which is adjacent to the widest part of the tire, is 13 mm, there being 5 mm of rubber inside the tire carcass, and 5 mm outside. At the shoulder of the tire 'E' the overall thickness of the sidewall has increased to 27 mm, the thickness of rubber inside the carcass being 9 mm and that outside being 16 mm.

The tire is shown in FIG. 4 mounted on a rim 18 in the fully statically loaded, deflated condition. In this state the interior surface of the tire is in contact with itself in two places, but the curvature of the folded sidewalls is kept to a minimum by the compression of the rubber at 'F' inside the neutral axis of the tire sidewalls.

The tire and wheel assembly is internally lubricated to enable it to be used in the deflated state.

It must be appreciated that the static load condition which is illustrated in FIG. 4 is not the highest load to which the tire will be subjected in dynamic conditions. A tire is rated for load under static conditions since it is obviously more convenient to specify this state. Under dynamic conditions, however, if a tire is carrying its full static load, the actual laod carried by the tire may be increased very considerably by, for example, weight transfer during braking or cornering.

Having now described our invention—what we claim is:

1. A pneumatic tire for use in a lubricated tire and wheel assembly capable of operation in a totally deflated condition which comprises a tread, braced by a breaker assembly, sidewalls and beads; said sidewalls hving smooth continuous interior and exterior surfaces and being arcuate throughout their extent and extending radially and axially outwardly from the beads to the region of maximum width of the tire, substantially midway between the beads and shoulder, then curving axially inwardly from that region and terminating at the shoulder, the sidewall rubber having a hardness between 45 and 65 Shore A and a rebound resilience of at least 85% measured at 50° C. by the Dunlop Pendulum method; a reinforcing carcass in the sidewalls, said carcass having cords extending in substantially radial planes, the width of said tread being at least 35% greater than the distance between the heels of the beads of the tire when inflated, the sidewalls each having, at their thinnest point, a thickness of at least 5% but not more than 10% of the overall width of the tire, at least 25% of said sidewall thickness consisting of rubber on the interior of the carcass of the tire, the tire having an aspect ratio, when inflated, of less than 75% and the part of the sidewall which is thinnest being immediately adjacent to the region of maximum width of the tire and having in that region substantially equal thicknesses of rubber on each side of the carcass, the thickness of the sidewall increasing from there towards the tire shoulder, at least 25% of the thickness of the sidewall in the entire region of the sidewall between the thinnest part of the sidewall and the tire shoulder comprising rubber on the inside of the tire carcass cords such that the carcass plies are positioned at or close to the center of the sidewall throughout said entire region.

2. A pneumatic tire according to claim 1, in which between 30% and 50% of the total thickness of the sidewall comprises rubber on the inside of the carcass.

3. A pneumatic tire according to claim 1 in which the tire has hard rubber in the bead region, said rubber having a hardness of at least 70 Shore A and a resilience greater than 60% measured at 50° C. by the Dunlop Pendulum method.

4. The tire of claim 1 including a bead apex strip having a resilience of 62% and a hardness of 80 Shore A.

5. The tire of claim 4 including a clinch strip in the sidewall adjacent the bead apex strip, said clutch strip having a resilience of 62% and a hardness of 80 Shore A.

* * * * *